Figure 1:
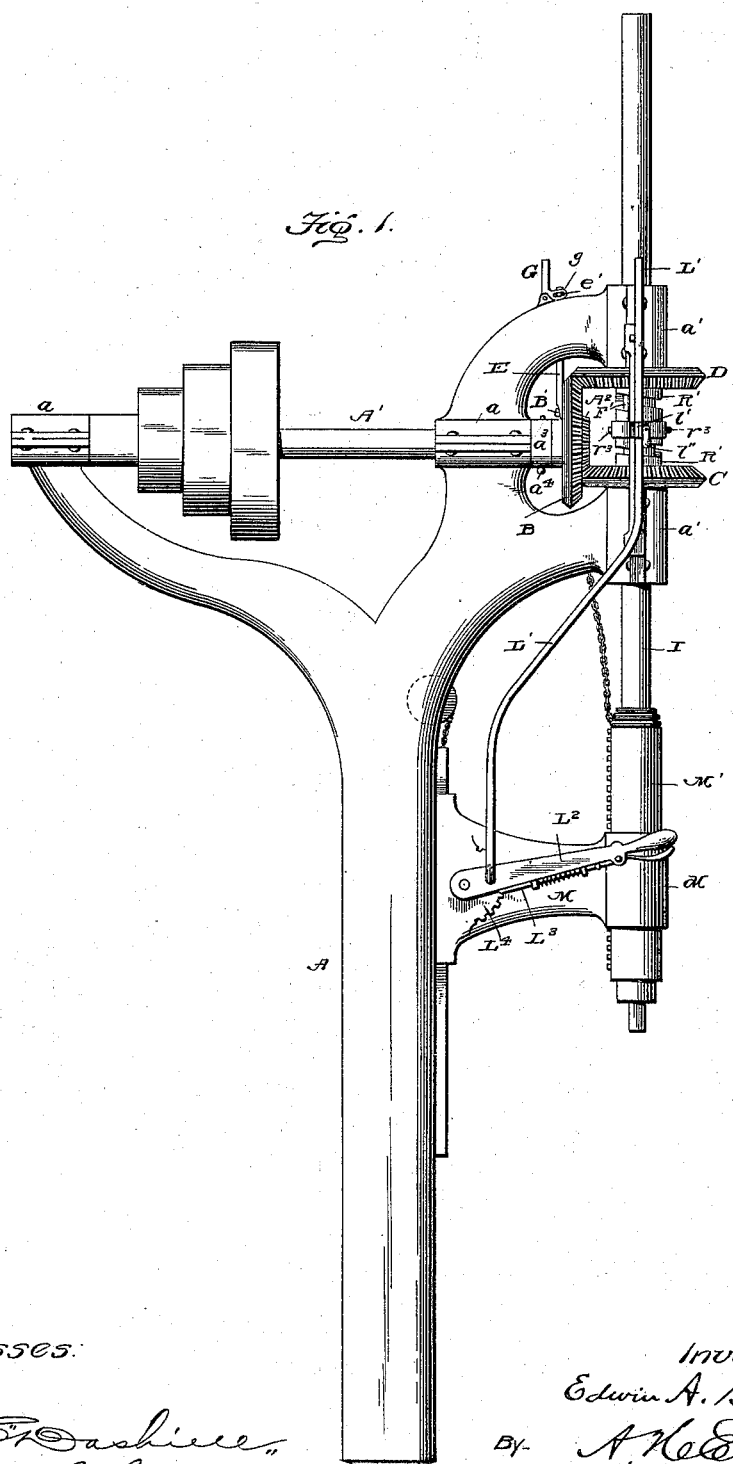

(No Model.)  2 Sheets—Sheet 1.

E. A. SEARLES.
DRILLING AND TAPPING MACHINE.

No. 535,420. Patented Mar. 12, 1895.

Witnesses:

Inventor:
Edwin A. Searles
By A. K. Evans & Co.
Att'ys.

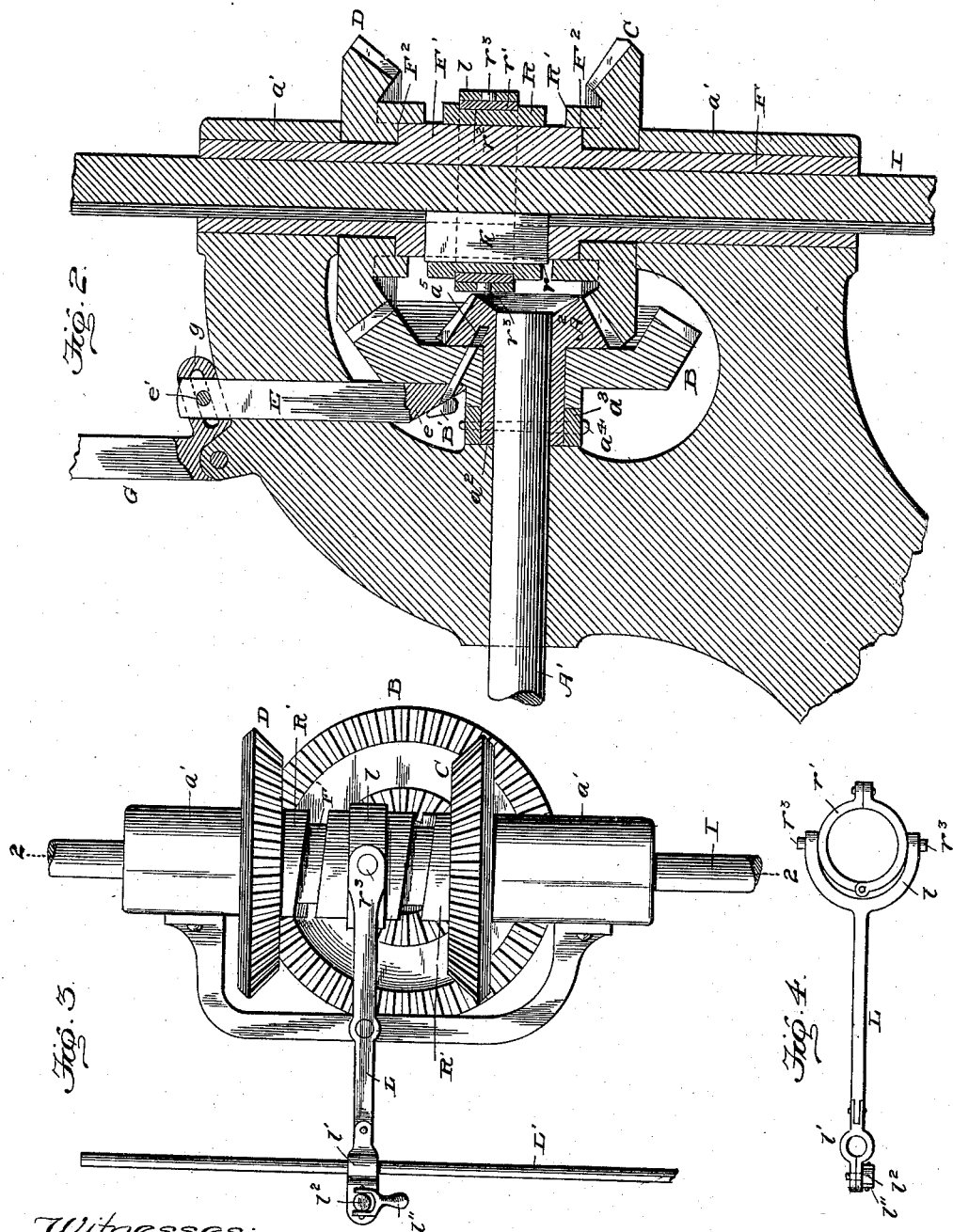

UNITED STATES PATENT OFFICE.

EDWIN A. SEARLES, OF BATTLE CREEK, MICHIGAN.

DRILLING AND TAPPING MACHINE.

SPECIFICATION forming part of Letters Patent No. 535,420, dated March 12, 1895.

Application filed December 27, 1894. Serial No. 533,101. (No model.)

*To all whom it may concern:*

Be it known that I, EDWIN A. SEARLES, a citizen of the United States, residing at Battle Creek, Calhoun county, Michigan, have invented certain new and useful Improvements in Drilling and Tapping Machines, of which the following is a full, clear, and exact description, reference being had to the accompanying drawings, forming part thereof, in which—

Figure 1 is a side elevation of a portion of a drilling machine with my improvement applied. Fig. 2 is a central, vertical section on line 2—2 Fig. 3. Fig. 3 is a front elevation and Fig. 4 is a detail.

The object of the invention is to provide the drill spindle with an operating gearing by which its rotation may be readily reversed to cause it to raise the tap after it has cut its thread for a bolt or screw; also to provide a clutch mechanism through which the said gearing may be operatively connected with the spindle to rotate it in either direction or by means of which the gearing may be permitted to run "idle" when it is desired to change the drills or taps, thereby rendering it unnecessary to stop the drive shaft or shift the driving belt; also to provide a mechanism for locking the two main driving gears together upon the drive or cone-pulley shaft or disconnecting them for independent action.

The invention will first be described and then specifically pointed out in the claims.

A represents the usual standard or pedestal of a drilling machine provided on its upper end with bearings $a$ $a$ for the horizontal drive or cone pulley shaft A', which is to receive power in the usual manner. The shaft A' is provided with a bevel gear $A^2$ at one end and this gear has an elongated hub or sleeve $a^2$ provided at its outer end with a collar $a^3$ through which and the hub and shaft passes a pin $a^4$ which secures them together.

B is a bevel gear of much greater diameter than the gear $A^2$ and it is mounted loosely on the hub $a^2$ thereof. This large gear B is provided with a transverse inclined opening, through which slides a locking pin B', adapted at its inner end to enter an opening $a^5$ in the adjacent side of the small gear $A^2$ and thus lock the said gears $A^2$ B together so that they will turn as one.

The outer end of the pin B' is headed and engaged by the lower inclined forked end $e$ of the pin-operating bar E which slides in a vertical opening in the upper over-hanging arm of the standard. The upper end of this bar E is connected with the slotted arm $g$ of the bell-crank lever G, by means of a pin $e'$ which extends through the slot thereof so that the bar will be raised or lowered according to the movement of the lever G as will be readily understood. When the bar E is forced down, its lower inclined, forked end $e$ will force the locking pin outwardly, thereby releasing the large gear B from the small gear $A^2$ and the gear B will thus be held stationary on the sleeve or hub $a^2$, but when the bar E is raised, the pin B' will again engage the opening $a^5$ (of which there may be any desired number) and lock the two gears together again.

F is a vertical sleeve turning freely in bearings $a'$ $a'$ on the machine standard above and below and in front of the gears $A^2$ B. This sleeve F has an enlarged portion F' between said bearings and thus the upper and lower shoulders $F^2$ are formed, which are engaged by the gears C D, respectively; the said gears being mounted on the reduced portions of the sleeve to turn freely thereon. The outer sides of the gears C D bear against the adjacent ends of the respective bearings $a'$ $a'$ so that said gears are held properly against endwise movement on the sleeve and the latter is held from longitudinal movement through the gears while permitted free rotary movement. The enlarged portion F' of the sleeve is provided with a longitudinal slot through which extends the flat key K, the inner vertical edge of which enters a longitudinal groove formed in the drill spindle I which slides freely through and turns with the said sleeve. The outer edge of the key K enters a vertical groove $r$ in the inner side of the clutch sleeve R, which slides freely upon and turns with the sleeve F. This clutch R is formed with ratchet-like teeth on its upper and lower edges which are adapted to engage similarly formed teeth on the clutch sections R' which are secured to or formed upon the hubs of the gears C D. This clutch sleeve by connecting either gear C D with the sleeve F, will cause the drill spindle to be correspondingly rotated, but in order that the sleeve F and drill spindle may remain stationary without stopping the drive shaft I make the clutch sleeve R of less length than the space between the two clutch sections R' so that it can occupy an intermediate position, and be disconnected from both.

The clutch sleeve R is operated by means of a collar $r'$ which fits loosely in an annular groove $r^2$ and is provided at opposite sides with trunnions $r^3$, which are engaged by the apertured ends of the yoke $l$, formed at one end of the lever L, which is pivoted to a bracket projecting from one side of the standard A. The lever L is operated by the connecting rod L' from the hand-lever $L^2$ pivoted to one side of the vertically adjustable arm M, mounted to slide in the usual manner on the front side of the standard A and carrying at its outer end the racked feed sleeve M', which is also actuated by the usual feed mechanism to raise and lower the drill spindle. The feed mechanism and mechanism for adjusting the arm M are not shown since they are those usually employed and form no part of the present invention.

The connecting rod L' is adjustably connected at its upper end with the lever L, so that it may be properly set to agree with the adjustment of the arm M. The lever $L^2$ is provided with a latch $L^3$ adapted to engage any one of three teeth on the segmental rack $L^4$, so that said lever may be locked and hold the clutch sleeve R in any one of its three positions. The adjustment of the rod L' is accomplished by passing it between the jaws of a clamp $l'$, pivoted to the outer end of the lever L; the said clamp being operated by a cam lever $l''$ mounted on a pin $l^2$ secured to one jaw and extending through an aperture in the other.

When a hole is to be drilled, the pin B' is forced outwardly, and the clutch sleeve R is thrown into engagement with the lower drill gear C, the vertical movement of the drill spindle being effected in the usual manner to feed it down or raise it. If the hole drilled is to be threaded, then the clutch sleeve is moved to its intermediate position and the drill replaced by a tap and then the clutch sleeve is again thrown into engagement with the gear C, until the threading is effected, after which the pin B' is thrown into engagement with the gear $A^2$, and the clutch sleeve R is moved up into engagement with the upper bevel gear D which will cause the motion of the drill spindle to be reversed, and its speed greatly increased, so as to rapidly withdraw the tap from the threaded aperture. Thus all of these various adjustments and changes are effected without stopping or reversing the drive shaft A.

If the tapping is to immediately follow the drilling, the gears B $A^2$ need not be disconnected as the gear D will simply run idly during the drilling.

Having thus described my invention, what I claim is—

1. The combination with the drive shaft having a large and a small drive gear, of a rotary drill-spindle sleeve having shoulders adjacent to the sleeve bearings and a slot between its shoulders, a key mounted in and projecting through the slot at both sides, loose gears mounted on the spindle-sleeve between the shoulders and sleeve bearings and meshing with opposite sides of the respective drive gears, a longitudinally grooved drill spindle sliding freely through the said sleeve and engaged by the said key, a clutch sleeve sliding on the drill-spindle sleeve between its shoulders and having an internal groove receiving the outer edge of the said key and mechanism for operating the clutch sleeve substantially as set forth.

2. The combination with the frame, the drive shaft having a small fast gear wheel and a large loose wheel alongside thereof, a locking mechanism carried by the frame and the small gear to lock the two gears together or lock the large gear to the frame against rotation, of the loose drill spindle gears meshing with the respective drive shaft-gears, a drill spindle sliding freely through said gears and a clutch mechanism for clutching either of the loose gears to the spindle to rotate it, substantially as set forth.

3. The combination with the drive shaft having a small fast gear wheel and a large gear wheel, of a rotary drill spindle sleeve having an enlarged middle portion forming shoulders and the two gear wheels loose on the spindle sleeve, and abutting against said shoulders at their inner faces and held at their outer sides by the sleeve bearings, a drill spindle splined to the interior of the said sleeve to slide freely therethrough and turn therewith, a clutch sleeve splined on the exterior of the said enlarged portion to turn with and slide on the sleeve into engagement with either of the sleeve gears and means for operating the said clutch sleeve, substantially as described.

4. The combination with the drive shaft and its fast and loose gears of different diameters and means for locking the loose gear to turn with the shaft, of the shouldered sleeve provided with the loose gear wheels meshing with the respective drive shaft gears, a key extending through the said sleeve to spline the drill spindle to its interior and a clutch sleeve splined to the exterior of the spindle sleeve by the outer edge of said key and means for operating the clutch sleeve, substantially as described.

5. The combination with the drive shaft having a fast gear wheel and a larger loose gear wheel provided with a locking pin to engage the smaller wheel, and means for operating said pin, of the loose drill spindle gears meshing with the drive shaft gears and a sliding clutch sleeve for clutching either of drill spindle gears to the spindle, substantially as described.

6. The combination with the standard, the drive shaft having a fixed gear wheel provided with an opening, and a larger loose gear wheel provided with a headed sliding pin to enter said opening and lock the two gears together, a sliding bar mounted on the frame and having a forked inclined end engaging the headed end of the pin and a lever for operating said bar, of the drill spindle sleeve provided with two loose gears meshing with the respective drive shaft gears, and a clutch mechanism for clutching either of said gears to the said sleeve, substantially as described.

7. The combination with the standard, the drill, splindle sleeve provided with the two loose gears and an intermediate clutch sleeve, a pivoted lever connected by a yoke, and ring, with the clutch sleeve, and having a clamping device at its outer end, a hand lever mounted on the lower adjustable standard arm through which arm the lower end of the drill spindle passes, an adjusting mechanism for said hand lever, and a rod adjustably connecting the two levers, substantially as described.

EDWIN A. SEARLES.

Witnesses:
OLIVER V. PRATT,
W. LEDINGHAM.